United States Patent

[11] 3,611,106

[72] Inventors Robert J. Mooney
 Southfield;
 Richard W. Johnston, Troy, both of Mich.
[21] Appl. No. 16,646
[22] Filed Mar. 5, 1970
[45] Patented Oct. 5, 1971
[73] Assignee General Motors Corporation
 Detroit, Mich.

[54] FAST RISE TWO-TRANSISTOR CONTROLLED RECTIFIER TRIGGER CIRCUITRY WITH CONTROL CIRCUIT ISOLATION
 3 Claims, 4 Drawing Figs.
[52] U.S. Cl........................................................ 321/5,
 307/252 R, 321/11, 321/47
[51] Int. Cl.................................................... H02m 7/52
[50] Field of Search............................................ 321/5, 8,
 11, 47; 307/252.51, 252.53, 252.55, 263, 268

[56] References Cited
 UNITED STATES PATENTS

| | | | |
|---|---|---|---|
| 3,244,960 | 4/1966 | Stevens et al. ................ | 321/8 |
| 3,360,709 | 12/1967 | Etter ............................. | 321/5 |
| 3,504,202 | 3/1970 | Rittman et al. ............... | 307/252.51 |
| 3,530,357 | 9/1970 | Leowald........................ | 307/252.54 |
| 3,535,610 | 10/1970 | Maynard ...................... | 321/47 X |

Primary Examiner—William H. Beha, Jr.
Attorneys—E. W. Christen, C. R. Meland and Albert F. Duke ABSTRACT: A trigger system for gating controlled rectifiers to a conductive state. In this trigger system, a plurality of controlled rectifiers are controlled by trigger circuits each of which employs two transistor-switching means in conjunction with a source of control voltage. In each of the trigger circuits, a first transistor-switching means is biased to its conductive mode by a DC source until, in response to a control signal from the control source, it switches to its nonconductive mode. This mode change by the first switching means causes the second transistor-switching means to become conductive which results in a gate signal being applied by means of a pulse transformer to a controlled rectifier. Each of the pulse transformers employed to couple the controlled rectifiers with their respective trigger circuits is provided with an electrostatic shield interposed between its primary winding and its secondary winding. These electrostatic shields are conductively interconnected to provide isolation between the controlled rectifier circuitry and the trigger circuitry.

INVENTORS
Robert J. Mooney &
BY Richard W. Johnston

C. L. Meland
ATTORNEY 3,611,106

1

FAST RISE TWO-TRANSISTOR CONTROLLED RECTIFIER TRIGGER CIRCUITRY WITH CONTROL CIRCUIT ISOLATION

This invention relates to a trigger system for developing signals that are capable of gating controlled rectifiers conductive. Each trigger circuit of this system is comprised of a first transistor-switching means whose output is connected across the input of a second transistor-switching means. In this configuration, the second transistor-switching means is switched from its nonconductive mode to its conductive mode when the first transistor-switching means switches from its conductive mode to its nonconductive mode. Control of the trigger circuit is provided by a control signal from a control source which causes the first transistor-switching means to switch from its conductive mode to its nonconductive mode. A pulse transformer serially connected with the output of the second transistor-switching means provides a gate signal to a controlled rectifier to gate the controlled rectifier conductive when the second transistor switching switches from its nonconductive mode to its conductive mode. Accordingly, the controlled rectifier is gated conductive in response to signals from the control source.

Spurious voltages are rendered ineffectual to switch either of the transistor-switching means by reason of various features of this invention. For example, spurious voltages appearing at the input to the first transistor-switching means and at the input to the second transistor-switching means are shunted to a reference potential conductor by a resistor and a conducting transistor-switching means, respectively. In this manner, spurious voltages do not interfere with the triggering of the controlled rectifiers and the occurrence of gate signals is constrained to coincide with the presence of a signal from the control source.

In electrical systems wherein a plurality of controlled rectifiers are employed, this invention affords a trigger circuit with high-noise immunity. Each trigger circuit's pulse transformer is provided with an electrostatic shield interposed between the primary winding and the secondary winding of the pulse transformer. All of the electrostatic shields are conductively interconnected to provide a path for circulating current induced in the shields by reason of coupling with the controlled rectifier circuitry. In this manner, the invention precludes spurious voltages from being coupled from the controlled rectifier circuitry to the trigger circuitry.

Accordingly, it is an object of the present invention to provide a noise-immune fast-rise trigger system for gating controlled rectifiers to a conductive state.

Another object of this invention is to provide a controlled rectifier trigger system wherein two transistor-switching means are employed in a trigger circuit for developing controlled rectifier gate signals and wherein the transistor-switching means are so connected and biased as to eliminate false triggering by spurious noise signals.

Still another object of this invention is to provide a controlled rectifier trigger system wherein a plurality of controlled rectifiers are controlled by a plurality of trigger circuits through pulse transformers provided with electrostatic shields interposed between the primary and secondary windings thereof to electrostatically isolate the controlled rectifier circuitry from the trigger circuitry thereby ensuring against switching which could accompany spurious voltages capacitively coupled from the secondary windings to the primary windings of the pulse transformers.

Additional objects and advantages of this invention will be apparent in light of the following description. The accompanying drawings which disclose a preferred embodiment of the present invention are incorporated in this description.

In the drawings:

FIG. 1 is a block diagram of a polyphase AC induction motor system supplied from a power source with the induction motor through controlled rectifiers which are controlled by noise-immune fast-rise trigger circuits constructed in accordance with this invention.

2

Figure 1:
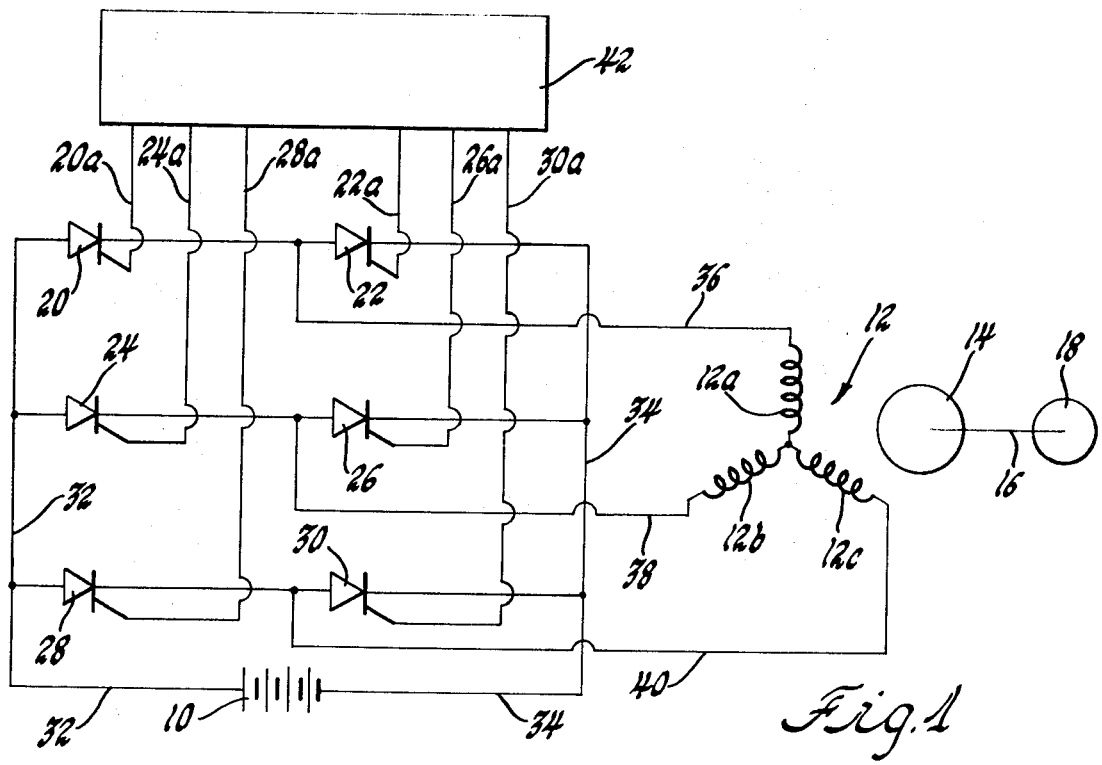

Referring now to the drawings and more particularly to FIG. 1, a DC voltage source 10 is depicted which provides power to an induction motor 12 having a squirrel cage rotor 14 which drives a load 18 through a shaft 16. The three phase windings 12a, 12b, and 12c of the motor 12 are connected with the source of power 10 through a conventional inverter which includes controlled rectifiers 20, 22, 24, 26, 28, and 30.

In FIG. 1, the anodes of the controlled rectifiers 20, 24, and 28 are connected to input power supply conductor 32 which is connected to the positive terminal of the DC voltage source 10. The cathode of the controlled rectifiers 22, 26, and 30 are connected to input power supply conductor 34 which is connected to the negative terminal of the DC voltage source 10. Three conductors 36, 38, and 40 connect the phase windings of the motor 12 with the controlled rectifiers. Conductor 36 connects phase winding 12a with the cathode of controlled rectifier 20 and the anode of controlled rectifier 22. Conductor 38 connects phase winding 12b with the cathode of controlled rectifier 24 and the anode of controlled rectifier 26. And conductor 40 connects phase winding 12c with the cathode of controlled rectifier 28 and the anode of controlled rectifier 30. This connection permits AC power to be delivered to the motor 12 from the DC voltage source 10.

In the inverter's operation, the controlled rectifiers 20–30 are switched alternately conductive and nonconductive by gate signals provided from the trigger logic network 42 on the conductors 20a, 22a, 24a, 26a, 28a, and 30a. Successive pulses from the trigger logic network 42 cause triggering of controlled rectifiers in accordance with a predetermined trigger sequence such as that shown in FIG. 2. In this manner, each controlled rectifier is biased conductive for 120 electrical degree periods separated by 240 electrical degree nonconductive periods. This provides the necessary three-phase power to operate the induction motor 12.

Figure 2:
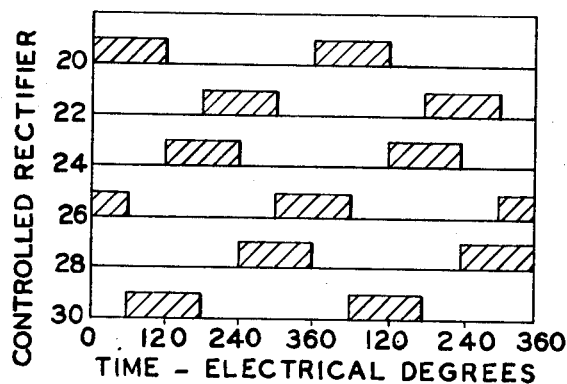
FIGS. 2 and 3 illustrate graphically the conduction periods for the controlled rectifiers and the voltages supplied the phase windings of the induction motor.

The crosshatched areas of the graph illustrated in FIG. 2 indicate the requirements for gate signals on the various gate conductors. These crosshatched areas also define the conducting periods for the various controlled rectifiers as plotted against time represented as electrical degrees. This graph also shows the switching sequence of the controlled rectifiers employed in the inverter of this motor system.

Figure 3:
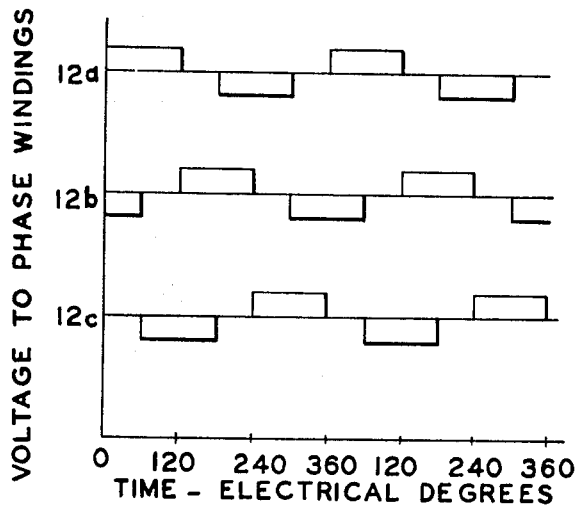

Each of the phase windings 12a, 12b, and 12c is provided with positive and negative voltages of 120° duration. The voltages supplied these various phase windings when using the switching sequence depicted in FIG. 2 are illustrated in FIG. 3. The three-phase motor operation which results is readily comprehended by considering FIGS. 2 and 3 in combination.

Referring to FIGS. 2 and 3, it is seen that from 0 to 60 electrical degrees the controlled rectifiers 20 and 26 are conductive. During this time interval, as shown in FIG. 3, phase winding 12a is supplied a positive voltage pulse and phase winding 12b is supplied a negative voltage pulse. Further considering the two graphs in unison, it is noted that at 60 electrical degrees controlled rectifier 26 is rendered nonconductive thus terminating the power supplied to phase winding 12b. At the 60 electrical degree point, controlled rectifier 30 is gated conductive resulting in a negative voltage pulse being initiated to phase winding 12c. Continuing the analysis of the operation, at 120 electrical degrees the controlled rectifier 20 is rendered nonconductive terminating the voltage pulse to phase winding 12a and, simultaneously controlled rectifier 24 is gated conductive initiating a positive voltage pulse to phase winding 12b. By following the successive controlled rectifier pulses and the resultant voltage pulse to the motor windings, the three phase motor operation is appreciated.

Each of the conductive periods for the various controlled rectifiers is initiated by a pulse derived from the trigger logic network 42. Since the source of power 10 is a direct current source rather than an alternating current source, it is necessary to provide commutating means to turn off the controlled rectifiers. This need for commutating means follows from the fact that there is no inherent turn off provided when power to a controlled rectifier is supplied from a direct current source. Although FIG. 1 does not show means for commutation, it is understood that commutation can be effected by incorporating an axially power supply, shutoff controlled rectifiers, and commutating capacitors in the manner disclosed in the U.S. Pat. No. 3,384,804 to Salihi. The logic network 42, of course, controls both turn-on and turnoff of the controlled rectifiers. It will, of course, be appreciated that the output frequency of the inverter and, therefore, the frequency of the voltage applied to the motor can be varied by varying the frequency of the pulses developed by network 42.

Figure 4:
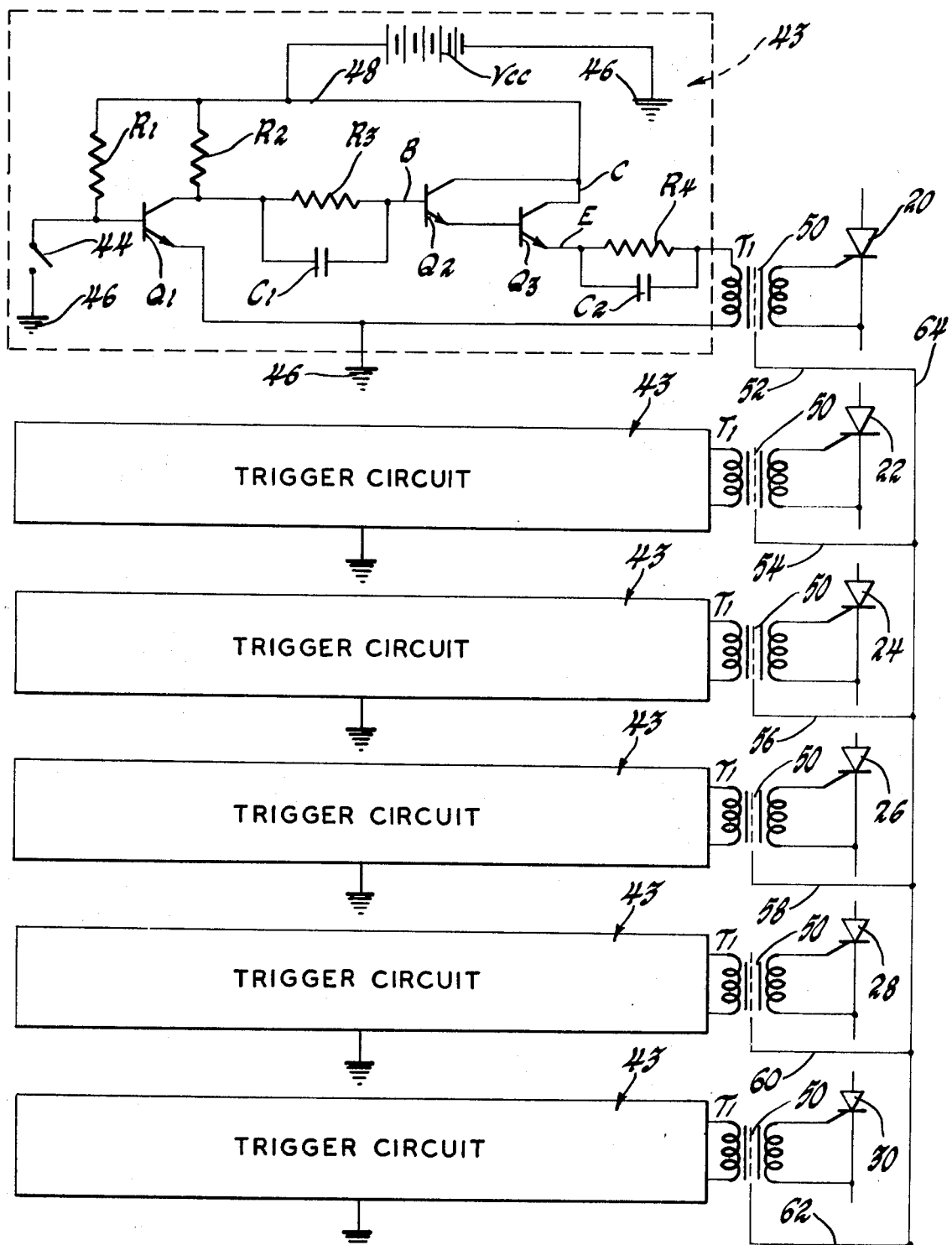
FIG. 4 is a detailed circuit diagram of a noise-immune fast-rise trigger circuit together with a plurality of additional trigger circuits identical to the detailed circuit and represented as blocks provided with pulse transformers and electrostatic shields which are interconnected in accordance with this invention.

Referring now to FIG. 4, a detailed schematic of one of the trigger circuits 43 of this invention is illustrated together with block representations 43 of the other five trigger circuits necessary to provide the requisite trigger signals for turning on the controlled rectifiers in FIG. 1. The six trigger circuits are identical and, therefore, only one of them will be described in detail.

In the detailed trigger circuit 43 of FIG. 4, a control means 44 represented in FIG. 4 as a switch is connected with the base and emitter terminals of a first transistor-switching means comprised of an NPN transistor $Q_1$. A second transistor switching means including the transistors $Q_2$ and $Q_3$ is controlled according to the mode of operation of the first transistor switching means. This control sequence determines the energization of the primary winding of transformer $T_1$ which subsequently determines whether or not a gate signal is applied to the gate-cathode control circuit of the controlled rectifier 20.

Continuing the explanation of the detailed trigger circuit, the DC source $V_{cc}$ provides DC voltage to energize and bias the various elements of the trigger circuit. Its negative terminal is connected with a reference potential conductor 46 denoted symbolically in the circuit schematic as a ground. The exact character of this reference potential conductor will vary from circuit application to circuit application. All that is required, however, is that the reference potential conductor be common throughout the system, for example, it can take the form of building ground. The positive terminal of the DC source $V_{cc}$ is connected with a conductor 48.

In the trigger circuit, a resistor $R_1$ connects the base of the transistor $Q_1$ with the conductor 48 which, as noted above, is connected with the positive terminal of the DC source $V_{cc}$. Likewise, a resistor $R_2$ connects the collector of the transistor $Q_1$ with the conductor 48. The emitter of the transistor $Q_1$ is conductively connected with the reference potential conductor 46. Accordingly, the transistor $Q_1$ is biased to saturation by the direct current source $V_{cc}$ when the control switch 44 is in its open position. When the control switch 44 is in its closed position, the base of the transistor $Q_1$ is at the same potential as its emitter and, accordingly, the transistor is nonconductive. Hence, it is seen that the control means 44, the resistor $R_1$, and the direct current source $V_{cc}$ cooperate in determining the bias applied to the base of the transistor $Q_1$.

While the transistor $Q_1$ is operating in its saturated mode, the output between the collector and the emitter of transistor $Q_1$ is substantially zero. This follows from the fact that the collector-emitter voltage drop during that period of time in which the transistor is in its saturated mode is quite small, being a function of the particular transistor. When the transistor $Q_1$ is operating in its nonconductive mode, the voltage output between the collector and the emitter of the transistor $Q_1$ assumes an appreciable positive value. This follows since the transistor $Q_1$ is essentially an open circuit when it is nonconductive.

The second transistor-switching means comprises the transistors $Q_2$ and $Q_3$ connected as a compound emitter follower. In this configuration, the pair of transistors provides a single base terminal B, a single emitter terminal E, and a single collector terminal C for external connection.

As shown in the circuit of FIG. 4, the base B of the second transistor switching means is connected with the collector $c$ of the first switching transistor $Q_1$ through a shunt combination of a resistor $R_3$ and a capacitor $C_1$. The collector C is conductively connected with conductor 48 which is connected with the positive terminal of the voltage source $V_{cc}$. The emitter E of transistor $Q_3$ is connected with conductor 46 through the primary winding of a transformer $T_1$ serially connected with a shunt combination of a resistor $R_4$ and a capacitor $C_2$. It is noted that the second transistor-switching means is in its conductive mode only when the first transistor-switching means is in its nonconductive mode. This follows since the base-emitter input of the second transistor-switching means is connected with the collector-emitter output of the first transistor-switching means and as noted above this output of the first transistor-switching means has a nonzero value only while the transistor $Q_1$ is in its nonconductive mode.

The secondary winding of the transformer $T_1$ is connected with the gate-cathode control circuit of the controlled rectifier 20. When the transistor $Q_3$ is biased fully on, the primary winding of transformer $T_1$ is connected across the direct current source $V_{cc}$. This causes a signal to be developed in the secondary winding of the transformer $I_1$ of the proper polarity to cause the gate of the controlled rectifier 20 to be positive with respect to its cathode. Thus, the controlled rectifier 20 is gated conductive when the second transistor-switching means switches to its conductive mode.

By way of summary, the controlled rectifier 20 is gated conductive in response to the control means 44. Two base bias levels are provided the base of transistor $Q_1$ by the coaction of the control means 44, the resistor $R_1$, and the direct current source $V_{cc}$. When the switch 44 is in its open position, the transistor $Q_1$ is provided the requisite bias to cause it to operate in its saturated mode. To turn the transistor $Q_1$ off, the potential on the base electrode is reduced to the potential of the reference conductor 46 by closing the switch 44. Hence, the control means 44 provides signals to the transistor $Q_1$ which alternately bias the transistor on and off. In operation, the control means 44 can be a conventional NAND logic gate having a transistor output wherein the transistor output provides an open and a closed circuit as does the switch 44 of FIG. 4. The state of the output transistor of the NAND gate is determined by the input supplied to the NAND gate in a manner generally known in the art. Continuing the summary, the control sequence which results in the controlled rectifier 20 being gated conductive is initiated when the control switch 44 closes, biasing the transistor $Q_1$ to its nonconductive mode. When the transistor $Q_1$ switches to its nonconductive mode, it provides a high-voltage output between its collector and emitter. Since, as noted above, the collector-emitter output of the transistor $Q_1$ is connected with the base-emitter input of the second transistor-switching means $Q_2$ and $Q_3$, a switching signal is developed at the input of the second transistor-switching which causes to switch to its conductive mode. In its conductive mode, the second transistor-switching means connects the primary winding of the transformer $T_1$ across the direct voltage source $V_{cc}$. The resultant voltage pulse is coupled to the secondary winding of the transformer $T_1$ to gate the controlled rectifier 20 conductive. When the transistor $Q_1$ is switched to its conductive mode by bias voltage provided when the control switch 44 is open, the collector-emitter voltage of the transistor $Q_1$ is reduced to approximately zero and the second transistor switching means $Q_2$ and $Q_3$ is switched to its nonconductive mode terminating the current supplied to the primary winding of the transformer $T_1$.

Spurious voltages which may appear in the trigger circuit are rendered ineffectual to cause false switching of either of the transistor switching means. Any spurious voltage appearing at the base of the transistor $Q_1$ is shunted to the reference potential conductor 46 through the resistor $R_1$ and the voltage source $V_{cc}$. Resistor $R_1$ is a low-resistance element having a resistance value on the order of 2,700 ohms and the voltage source $V_{cc}$ also provides a low internal resistance for current flow. Accordingly, any spurious voltage which could be detrimental to the switching operation is shunted from the base of transistor $Q_1$ and, thereby, rendered ineffectual to cause false switching of the transistor $Q_1$ and, subsequently, to cause spurious turn-ons of the controlled rectifier 20. Since the base B of the second transistor switching means is connected with the collector of the transistor $Q_1$, any spurious voltage which could appear at the base B of the second transistor-switching means $Q_2$ and $Q_3$ is shunted to the reference potential conductor 46 through the collector-emitter circuit of transistor $Q_1$ when the transistor $Q_1$ is in its conductive mode. In this manner, when the second transistor-switching means is in its nonconductive mode, the recited connection between the base-emitter input of the second transistor-switching means $Q_2$ and $Q_3$ and the collector-emitter output of the transistor $Q_1$ obviates spurious switching of the second transistor-switching means.

The two shunt resistor capacitor combinations, namely, $R_3$, $C_1$ and $R_4$, $C_2$, afford rapid response in the trigger circuit. In this manner, a fast-rise trigger is realized wherein switching is enhanced by the shunt combination of the resistor $R_2$ and the capacitor $C_1$ and the voltage available to the primary winding of the transformer $T_1$ is more effective as a signal for gating the controlled rectifier 20 by reason of the combination of the resistor $R_4$ and the capacitor $C_2$.

Each of the pulse transformers $T_1$ in FIG. 4 is provided with an electrostatic shield 50. These shields are comprised of nonmagnetic, conductive material such as copper or aluminum. When the core is wound, the shield is interposed between the primary winding and the secondary winding in foil or sheet form. To prevent the shield from being a shorted turn, the ends of the foil are electrically isolated from each other. The core is conductively isolated from the shield to avoid grounding the shield and to prevent current loops through the shield and core.

In this manner, the circuitry associated with the secondary windings including the controlled rectifiers is effectively isolated in a manner described hereinafter from the circuitry associated with primary windings including the trigger circuits. The electrostatic shields are intentionally isolated from the reference potential conductor 46 to ensure effective isolation is obtained. They are, however, connected with a common conductor 64 by conductors 52, 54, 56, 58, 60, and 62 to provide a path for circulating currents induced by voltages in the secondary winding circuitry. It is known to those skilled in the art of inverter design that substantial potential difference can develop between the cathodes of various pairs of controlled rectifiers during inverter operation. In particular, when commutation is effected by the inclusion of auxiliary power supplies, shutoff controlled rectifiers, and commutating capacitors as noted above, large voltages can be developed between cathodes of power controlled rectifiers and cathodes of shutoff controlled rectifiers. Since each of the controlled rectifiers, power and shutoff, is connected with a trigger circuit identical to the one shown in FIG. 4, it is apparent that in the absence of effective shielding these voltages can cause substantial currents to flow in a path starting at the higher potential controlled rectifier cathode which includes: a conductive connection with the secondary winding of the transformer connected with the high potential controlled rectifier cathode and a capacitive connection between the secondary winding and the primary winding of that transformer; a ground path including the reference potential conductor common to each trigger circuit, the current would be conducted from the transformer of the trigger circuit connected with the high-potential controlled rectifier through the common ground connection to the transformer of the trigger circuit connected with the low-potential controlled rectifier; and a capacitive connection from the primary winding of this transformer to its secondary winding which is conductively coupled to the cathode of the low-potential controlled rectifier. These spurious currents can cause false triggering by the trigger circuits. This follows since the large currents involved create significant voltages in various conductors of the trigger circuits. These voltages can result in unwanted switching of controlled rectifiers which is detrimental to the system operation.

Use of electrostatic shields in the known manner does not alleviate the problem. A shield interposed between the primary and secondary windings of each transformer, grounded or not, does not isolate the circuitry of the secondary windings from the circuitry of the primary windings.

The shield arrangement and interconnection of this invention does eliminate adverse switching by effectively isolating the circuitry of the secondary windings from the circuitry of the primary windings. In the arrangement of this invention, current from a high-potential cathode to a low-potential cathode flows in a path starting at the higher potential controlled rectifier cathode which includes: a conductive connection with the secondary winding of the transformer connected with the high-potential controlled rectifier cathode and a capacitive connection between the secondary winding of that transformer and the electrostatic shield interposed between the secondary winding and the primary winding of that transformer; a conductive connection from the above electrostatic shield through the conductor connecting it with the common conductor 64 of FIG. 4, through the conductor 64, and through a second connecting conductor to the electrostatic shield of the transformer connected with the low-potential controlled rectifier; a capacitive connection from this electrostatic shield to the secondary winding of its transformer which is conductively coupled to the cathode of the low-potential controlled rectifier. In this manner, the only voltage which can be coupled to the trigger circuit is that between the two electrostatic shields of the current path. This voltage is relatively low and is not capable of causing detrimental effects.

As noted above, in FIG. 4 each of the trigger circuits represented in block form is identical to the one described in detail. Each of the six trigger circuits is controlled by a separate control means similar to the control switch 44. However, in order to provide the trigger sequence of FIG. 2, each of the control means of the various trigger circuits provides control signals time displaced from the signals of the other control means. All of the control means are included in the trigger logic network 42 of FIG. 1. Proper synchronization is provided by circuitry in the network 42 of a known design which is neither shown nor described.

The trigger circuit of this invention is not to be construed as being restricted to applications involving a plurality of controlled rectifiers. It is equally adaptable to circuits wherein a single controlled rectifier is provided.

The above description of the invention proceeded in terms of NPN transistors and a control means providing a control signal whose polarity was determined by the requirements of the NPN transistors. This, however, is not limiting as one skilled in the art could readily substitute PNP transistors by altering appropriately the various voltages and still use the principle of this invention.

We claim:

1. A noise-immune trigger circuit for periodically gating a controlled rectifier to a conductive condition, comprising:
   a controlled rectifier;
   a transformer having a primary winding and a secondary winding, said secondary winding connected across the gate and cathode of said controlled rectifier;
   a source of direct current;
   first and second transistor-switching means;
   means connecting said primary winding of said transformer serially with the collector-emitter output of said second transistor-switching means across said source of direct current;
   means connecting said source of direct current with the base-emitter circuit of said first transistor-switching means such that said source of direct current biases said first transistor-switching means conductive;

means connecting the collector-emitter output of said first transistor-switching means across the base-emitter input of said second transistor-switching means whereby, said second transistor-switching means is biased nonconductive when said first transistor-switching means is biased conductive and said second transistor-switching means is biased conductive when said first transistor-switching means is biased nonconductive and said controlled rectifier is gated conductive when said second transistor-switching means is biased conductive;

and control means connected with the base-emitter input of said first transistor-switching means operative to periodically bias said first transistor-switching means nonconductive whereby, said controlled rectifier is gated conductive when said control means biases said first transistor-switching means nonconductive;

said first transistor-switching means providing a circuit through its collector-emitter circuit for conducting spurious voltages away from the base-emitter input of said second transistor-switching means when said first transistor-switching means is biased conductive.

2. A noise-immune trigger circuit for periodically gating a controlled rectifier to a conductive condition comprising:

a controlled rectifier;

a transformer having a primary winding and a secondary winding, said secondary winding connected across the gate and cathode of said controlled rectifier;

a source of direct current;

first and second conductor means connected respectively with the first and second terminals of said source of direct current, said first conductor means providing a reference potential;

first and second transistor-switching means;

means connecting said primary winding of said transformer serially with the collector-emitter output of said second transistor-switching means between said first conductor means and said second conductor means;

a resistor, said resistor connected between the base of said first transistor-switching means and said second conductor means;

means connecting the emitter of said first transistor-switching means with said first conductor means;

means connecting the collector of said first transistor-switching means with said second conductor means whereby, said first transistor-switching means is biased by said source of direct current to its conductive mode;

means connecting the collector-emitter output of said first transistor-switching means across the base-emitter input of said second transistor-switching means whereby, said second transistor-switching means is biased nonconductive when said first transistor-switching means is biased conductive and said second transistor-switching means is biased conductive when said first transistor-switching means is biased nonconductive and said controlled rectifier is gated conductive when said second transistor-switching means is biased conductive;

and a control means connected with the base-emitter input of said first transistor-switching means operative to periodically bias said first transistor-switching means nonconductive whereby, said controlled rectifier is gated conductive in response to said control means;

said resistor providing low-impedance shunt path for spurious voltages appearing at the base-emitter input of said first transistor-switching means to render such spurious voltages ineffectual as switching signals for said first transistor-switching means;

said first transistor-switching means providing a circuit for conducting spurious voltages away from the base-emitter input of said second transistor-switching means when said first transistor-switching means is biased conductive by said source of control signals and said source of direct current.

3. A system for periodically gating a plurality of controlled rectifiers of an electrical power supply system sequentially conductive, comprising:

a plurality of controlled rectifiers;

a plurality of transformers, each transformer having a primary winding and a secondary winding;

means connecting the secondary winding of each transformer across the gate-cathode control circuit of its respective controlled rectifier;

means including a plurality of trigger circuits connected to the primary windings of said transformer providing triggering signals to said primary winding to provide a predetermined firing sequence for said controlled rectifiers;

a plurality of electrostatic shields comprising nonmagnetic-conductive material interposed between the primary windings and the secondary windings of the respective transformers;

and conductive means having no conductive connection with said trigger circuits interconnecting all of said electrostatic shields to provide a path for currents induced in the various electrostatic shields during operation of said system whereby, the secondary windings of said transformers are effectively isolated from the primary windings and said trigger circuits connected therewith to eliminate unwanted switching of said controlled rectifier due to voltages which might otherwise be coupled between said primary and secondary windings.